Feb. 20, 1923.
G. G. GOCKE.
LUNCH CABINET.
FILED AUG. 9, 1921.
1,446,008.
2 SHEETS—SHEET 1.
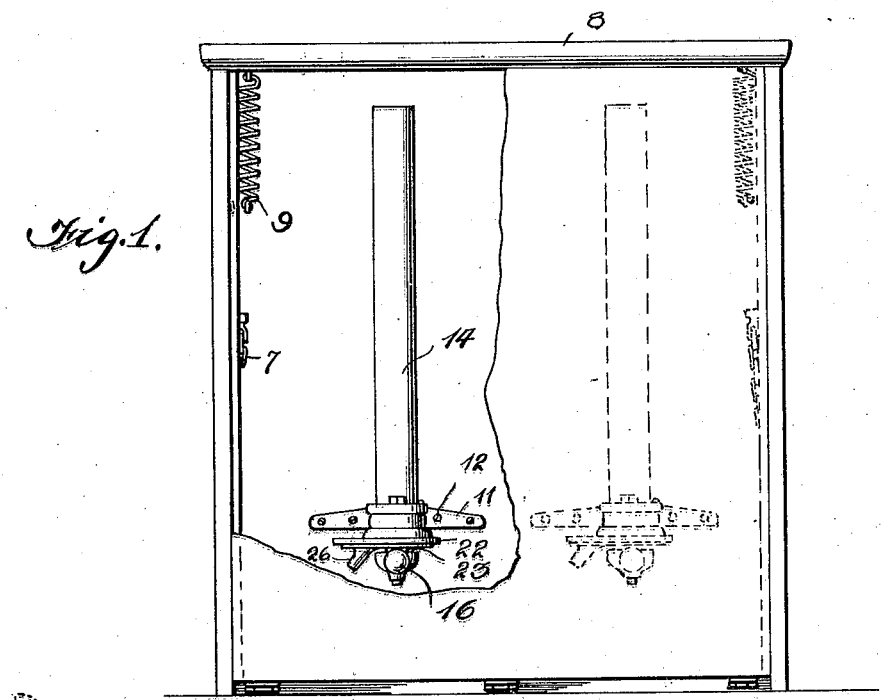
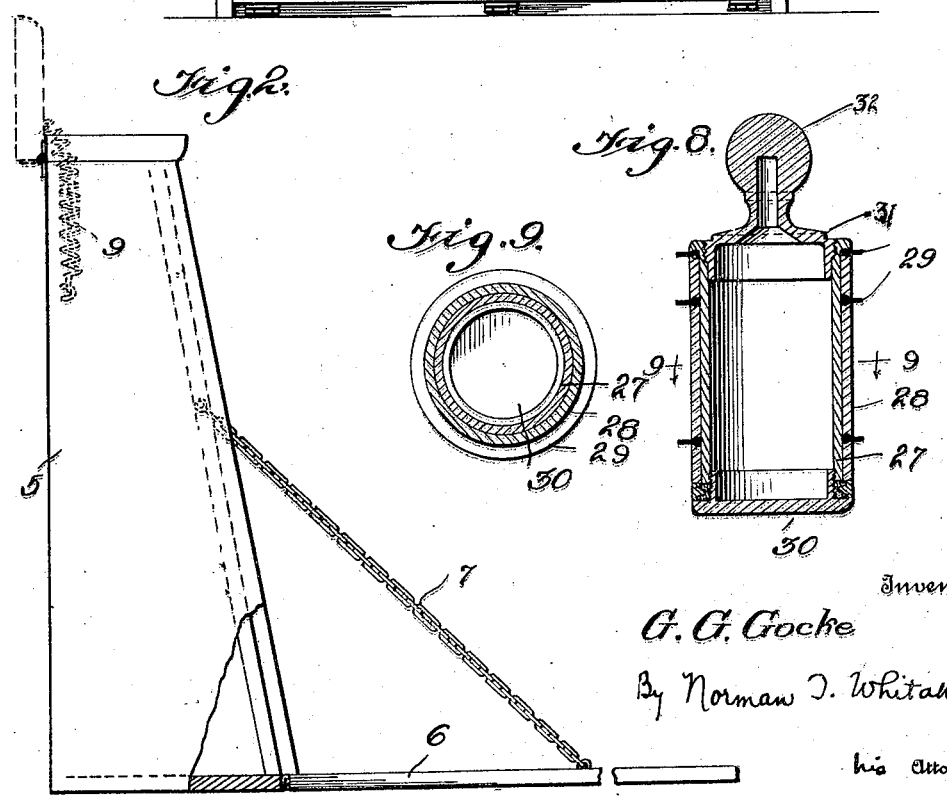
Inventor
G. G. Gocke
By Norman J. Whitaker
his Attorney

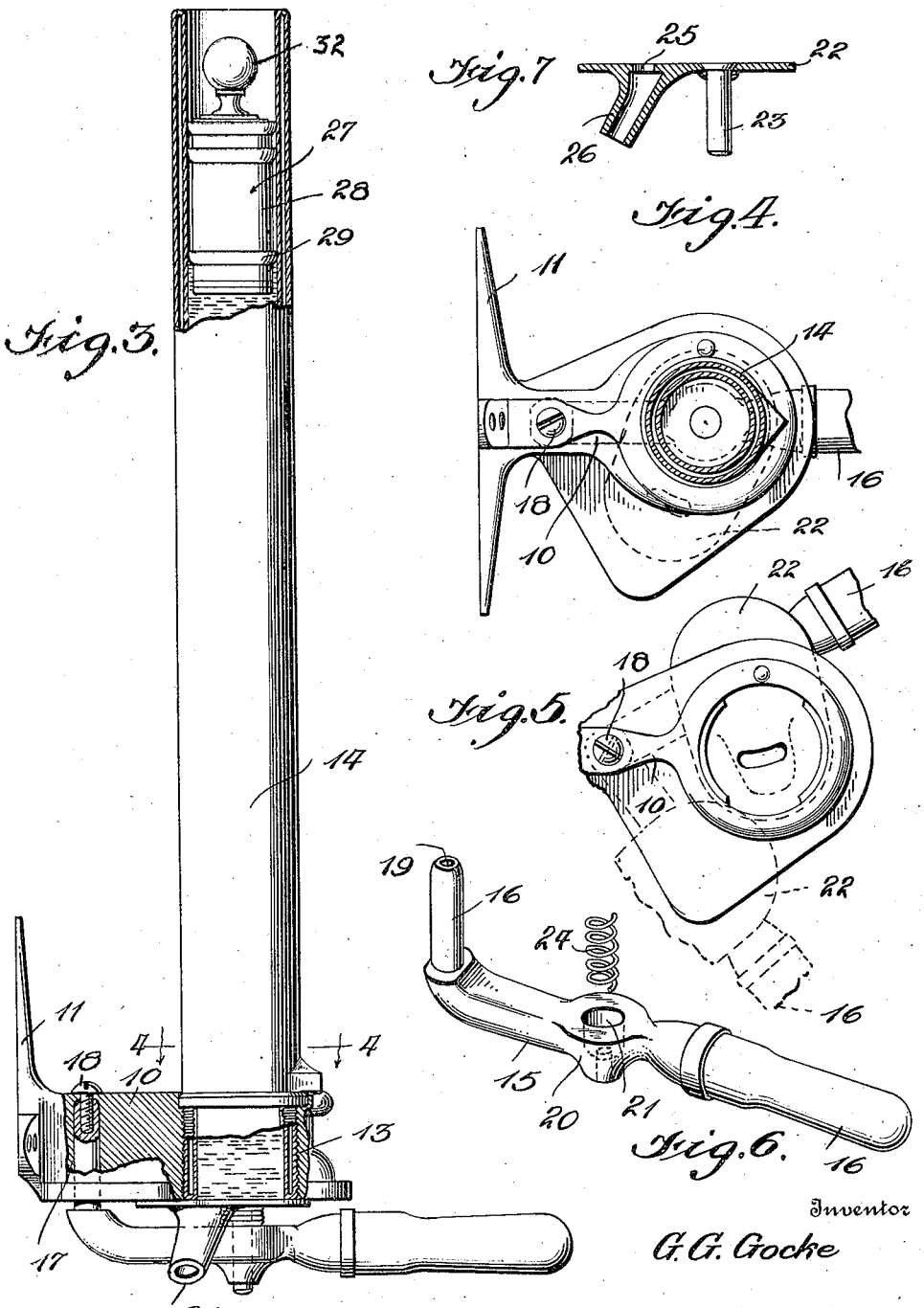

Patented Feb. 20, 1923.

1,446,008

UNITED STATES PATENT OFFICE.

GUSTAV G. GOCKE, OF LONG BEACH, CALIFORNIA.

LUNCH CABINET.

Application filed August 9, 1921. Serial No. 490,922.

*To all whom it may concern:*

Be it known that I, GUSTAV G. GOCKE, a citizen of the United States, and a resident of Long Beach, in the county of Los Angeles and State of California, have invented a Lunch Cabinet, of which the following is a specification.

My invention relates to lunch cases and its principal object resides in the provision of a cabinet or case in which a plurality of receptacles are mounted, adapted to retain food, either liquid or solid, and retain the same in a hot or cold state as the requirements may be.

A further object of the invention is to provide a thermos tube which may contain a heated liquid such as coffee or solid food in the cold state such as block ice cream, together with a common means for controlling the discharge of the contents of the tube.

It is also an object of the invention to provide a thermos receptacle of this character employing a cut-off or valve provided with a discharge spout at one side thereof, thus, when the tube contains a liquid the cut-off or valve is adapted to be moved to a position where the discharge spout will register with the bore of the receptacle to permit part of the contents thereof to flow therefrom, and, when containing solids is adapted to be moved to a position where it will be disposed to one side of the receptacle.

With the preceding and other objects and advantages in mind, the invention consists in the novel combination of elements, construction and arrangement of parts and operations to be hereinafter referred to and explicitly defined in the subjoined claims.

On the drawings,

Figure 1 is a front elevation of the lunch cabinet constructed in accordance with my invention, parts being broken away to show one of the thermos receptacles mounted therein, Fig. 2 is a side elevation of the cabinet in open position, parts being broken away, Fig. 3 is a view partly in elevation and partly in cross section of the thermos receptacle, Fig. 4 is a transverse sectional view taken on line 4—4 of Fig. 3, Fig. 5 is a fragmentary bottom plan view showing the relative positions of the cut-off, Fig. 6 is a perspective of the control lever and coil spring used in conjunction therewith, Fig. 7 is a detail view of the cut-off or valve, Fig. 8 is a vertical sectional view of the piston or follower used in conjunction with the invention, and Fig. 9 is a horizontal sectional view taken on line 9—9 of Fig. 8.

Referring in detail to the drawings, wherein similar characters of reference designate corresponding parts throughout the several views, the numeral 5 designates a cabinet open at one side and at the top thereof. A door 6 is hinged to the lower edge of the cabinet 5 and is adapted to close the open side thereof when not in use. When the cabinet is in use this door 6 is suspended in horizontal position as shown in Fig. 2 by flexible elements 7 attached to the door 6 and the sides of the cabinet 5. A door 8 is hinged to the upper edge of the cabinet and attached thereto and to the sides of the cabinet are contractile springs 9 which after the door 8 is released by the operator is moved to closed position.

In the cabinet 5 there is mounted a plurality of thermos receptacles adapted to contain either solid or liquid food and retain the same either in a cold or hot state as the requirements may be. As these thermos receptacles are identical in construction and detail description one will suffice for all.

My improved thermos receptacle comprises a horizontally disposed casting 10 formed with a bracket 11 at one end secured within the cabinet 5 by fastenings 12. This casting 10 is formed with a threaded opening 13 in which one end of a double walled cylinder or receptacle is threaded.

The numeral 15 designates an operating lever formed with an insulated handle 16 at one end. The opposite end of this lever 15 is formed with an upstanding pivot pin 16 which is received in a vertical bore in the casting 10. This pivot pin 16 is held against longitudinal movement by a set screw 18 passing through the casting 10 and threaded in an opening 19 in the pin 16. The lever 15 is formed with a boss 20 intermediate its ends provided with a central opening 21. Normally closing the lower end of the tube 14 is an elongated plate valve 22 which carries a depending stem 23 positioned in the opening 21 in the boss 20. In order to hold the plate valve 22 firmly against the lower end of the tube 14 a coil spring 24 is provided which encircles the stem 23 and has one end accommodated in the opening 21 and its opposite end positioned against the under face of the plate valve 22. The plate valve 22 is provided with a discharge opening 25 adjacent one end thereof and formed with the under face of this plate valve and registering with the opening 25 is an angularly disposed discharge pipe 26.

In order to prevent the entrance of air into the cylinder 14 by way of the upper end thereof there is provided a piston or follower designated in its entirety at 27. This piston or follower comprises a cylinder 28 carrying gaskets or packing rings 29 which insure tight fit of the piston or follower with the inner wall of the cylinder 14. A cap 30 is threaded in the lower end of the cylinder 28 while a second cap 31 is threaded in the upper end of this cylinder and is provided with a handle or knob 32. When the tube 14 is used to contain cold objects such as cakes of ice cream the piston or follower is filled with ice or any other cooling agent.

As illustrated in Fig. 3 the cylinder 14 is filled with a liquid. In this instance in order to dispense the liquid therefrom the lever 15 will be moved to the right as shown in full lines in Fig. 5. However, when the tube contains solids the lever 15 will be moved to the left as shown in dotted lines in Fig. 5.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States is:

1. A dispensing receptacle comprising a supported cylindrical tube, a plate valve normally closing the lower end of the tube and provided with a discharge spout, the plate valve being capable of being moved to a position to dispose the spout in registration with the tube when the latter contains a liquid to permit the liquid to be discharged therefrom, the plate valve being capable of being moved to a position to clear the tube when the latter contains solid articles.

2. A dispensing receptacle comprising a supported cylindrical tube, a plate valve normally closing the lower end of the tube and provided with a discharge spout, the plate valve being capable of being moved to a position to dispose the spout in registration with the tube when the latter contains a liquid to permit the liquid to be discharged therefrom, the plate valve being capable of being moved to a position to clear the tube when the latter contains solid articles, and a follower having air-tight fit within the tube and serving to close the tube above the height of the contents thereof and when the tube contains solid articles force the latter downwardly.

3. A thermos receptacle comprising a double walled tube supported in a vertical plane and adapted to contain solids or liquid, a handle pivoted below the lower end of the tube, a plate valve carried thereby and normally covering the lower end of the tube, a discharge spout depending from the plate valve and disposed adjacent one end thereof so that upon moving the handle in one direction the discharge spout will register with the tube and upon moving the handle in the opposite direction the plate valve will clear the tube.

4. A thermos receptacle comprising a double walled tube supported in a vertical plane and adapted to contain solids or liquid, a handle pivoted below the lower end of the tube, a plate valve carried thereby and normally covering the lower end of the tube, a discharge spout depending from the plate valve and disposed adjacent one end thereof so that upon moving the handle in one direction the discharge spout will register with the tube and upon moving the handle in the opposite direction the plate valve will clear the tube, and a piston in the tube adapted to move downwardly when the plate valve is in open position or when the discharge spout is in registration with the tube.

5. A thermos dispensing receptacle comprising a double walled tube, means for supporting the same in a vertical plane, a control lever pivoted below the lower end of the tube, a spring urged plate valve carried by the lever and normally held against the lower end of the tube, and a discharge spout depending from the plate valve and adapted to register with the tube when the lever is moved in one direction, the lever being adapted to be moved in the reverse direction to dispose the plate valve to one side of the tube.

6. In a thermos receptable, a supported casting provided with an opening, a tube mounted in the opening, an operating lever pivoted to the casting to swing about the horizontal axis and provided with a central opening intermediate its ends, a plate valve normally closing the lower end of the tube, a stem depending therefrom and engaged in the opening, a coil spring encircling the stem and holding the plate valve against the lower end of the tube, and a discharge spout depending from the plate valve.

7. In a dispensing receptacle, a casting, a bracket carried thereby to be attached to a support, the casting being provided with an opening and also provided with a vertical bore to one side of the opening, a tube supported in the opening adapted to contain either a liquid or solid, an operating lever disposed below the casting and including a vertical pin mounted for pivotal movement in the bore, the lever being also provided with a boss having an opening therein, a plate valve normally closing the lower end of the tube, a stem depending therefrom and engaged in the opening in the boss, and a coil spring accommodated in the opening and urging the plate valve against the lower end of the tube.

GUSTAV G. GOCKE.